Oct. 19, 1948.  P. B. BURRUS ET AL  2,451,802

CAM

Filed April 23, 1945  2 Sheets-Sheet 1

INVENTORS
Paul B. Burrus and Merton C. Leinberger
BY Henry G. Dylvig
ATTORNEY

Patented Oct. 19, 1948

2,451,802

UNITED STATES PATENT OFFICE 2,451,802

CAM

Paul B. Burrus and Merton C. Leinberger, Dayton, Ohio, assignors, by mesne assignments, to Worthington Pump and Machinery Corporation Application April 23, 1945, Serial No. 589,920

3 Claims. (Cl. 74—568)

This invention relates to a cam and more particularly to a cam that is provided with adjustable cam sectors.

An object of this invention is to provide a cam having adjustable cam sectors that permit adjustment of the cam without interrupting the continuity of the path of the cam follower.

Another object of this invention is to provide a cam that is easily manufactured, dependable, easily and accurately adjusted and that meets the exacting demands of precision instruments.

Other objects and advantages reside in the construction of parts, the combination thereof and the mode of operation, as will become more apparent from the following description.

Referring to the drawings.

Figure 1:
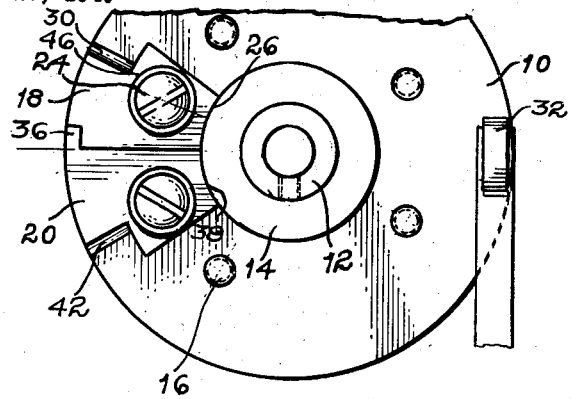
Figure 1 is a side elevational view of the cam with part broken away.

In the drawings, the reference character 10 indicates a disc attached to a pair of flanged collars 12, one on either side, which flanged collars cooperate to form a hub for the cam assembly. The flange 14 of the collar 12 is suitably attached to the side of the collar 12. The disc 10, the collars 12 and the flanges 14 may be integral. The disc 10 is provided with a plurality of screw threaded apertures 16. The centers of the apertures are located in the circumference of a circle concentric with the axis of rotation of the cam assembly.

Figure 6:
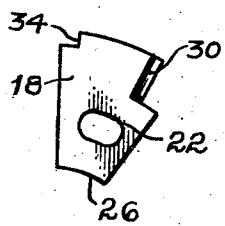
Figure 6 is a detail view of the upper cam sector shown in Figure 1.
Figure 7:
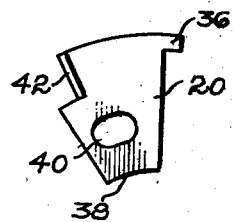
Figure 7 is a detail view of the lower cam sector shown in Figure 1.
Figure 8:
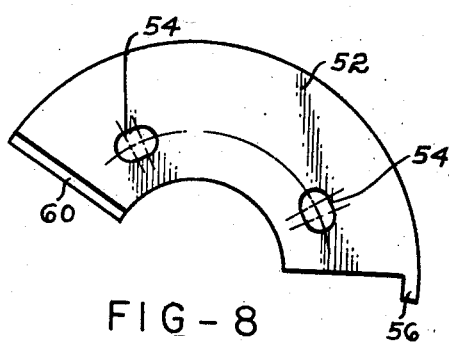
Figure 8 is a detail view of the upper cam sector shown in Figure 3.
Figure 9:
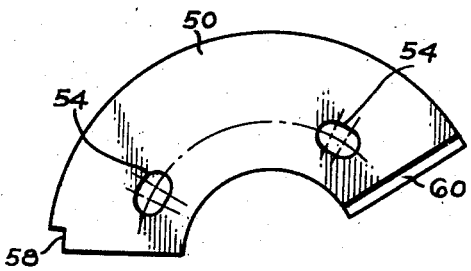
Figure 9 is a detail view of the lower cam sector shown in Figure 3.

As may best be seen by referring to Figure 1, a pair of cam sectors 18 and 20 are mounted on one side of the disc 10. The cam sector 18 has been shown in detail in Figure 6 and the cam sector 20 has been shown in detail in Figure 7. The cam sector 18 is provided with an elongated aperture or slot 22 that is adapted to receive a screw 24, shown in Figure 1, threadedly engaging one of the apertures 16. The slot 22 permits adjustment of the cam sector 18. The inner portion 26 of this cam sector is arcuate and contacts the circumferential margin of the flange 14, as clearly shown in Figure 1. Thus, the flange 14 provides an arcuate seat for the cam sector 18.

Figure 2:
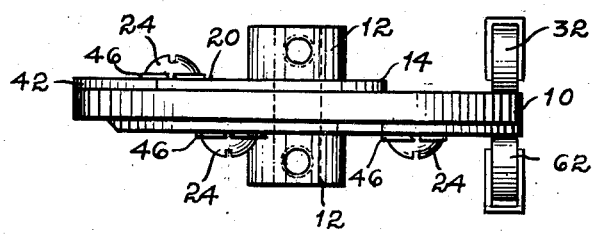
Figure 2 is another view of the cam as seen looking upwardly at the cam shown in Figure 1.
Figure 3:
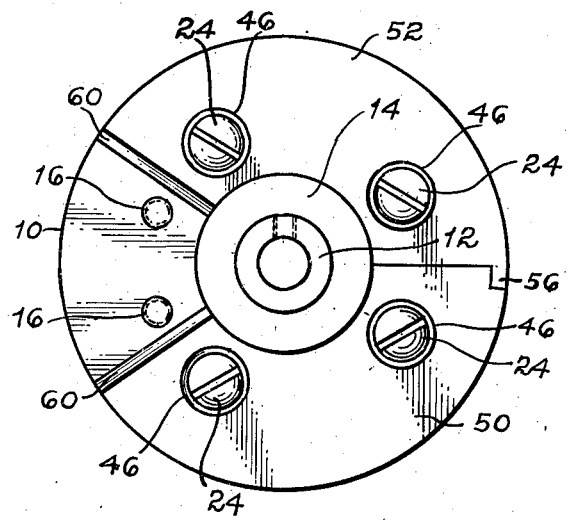
Figure 3 is another side elevational view of the side of the cam opposite the side shown in Figure 1.
Figure 4:
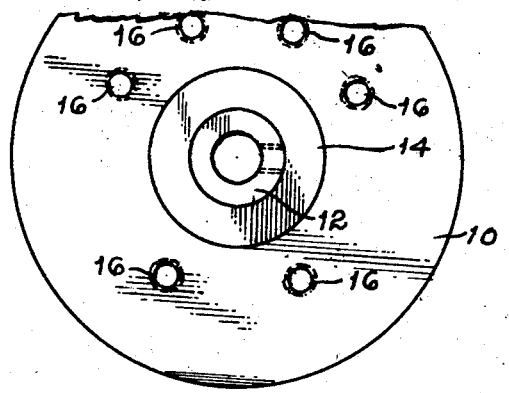
Figure 4 is a fragmentary, side elevational view of the disc forming the support for the cam segments with the segments removed.
Figure 5:
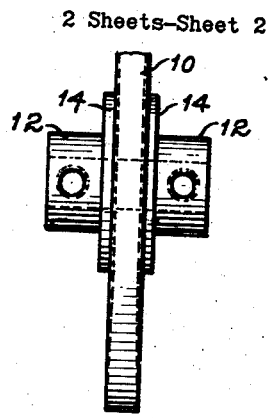
Figure 5 is a fragmentary view of the disc as viewed from the right of Figure 4.

A bevelled edge 30 provides a cam surface upon which a laterally movable cam follower 32, shown in dotted lines in Figures 1 and 2, may ride. A notch 34 is located in a corner of the cam sector 18 and is adapted to receive at least a portion of the tongue or extension 36 of the cam sector 20. This cam sector 20 is provided with an arcuate surface 38, similar to the inner portion 26. The cam sector 20 has an elongated aperture or slot 40, similar to the aperture or slot 22, and a bevelled edge or surface 42, similar to the bevelled edge 30. As shown in Figure 1, the extension 36 projects into the notch 34.

In order to adjust the area covered by the cam sectors 18 and 20, these cam sectors may be adjusted by loosening the screws 24 to permit movement of the cam sectors towards or away from each other, as the case may be, or the two cam sectors may be adjusted in unison in proper spaced relation circumferentially. The distance through which the cam sectors may be adjusted depends upon the length of the elongated slots 22 and 40. After these cam sectors are properly adjusted, the screws 24 may again be tightened against suitable lock washers 46, so as to rigidly hold the cam sectors in adjusted position with respect to the disc 10.

On the side of the disc 10 opposite the cam sectors 18 and 20, may be located another pair of cam sectors 50 and 52. For the purpose of illustration, the cam sectors 50 and 52 have each been provided with a pair of elongated apertures or slots 54 for receiving suitable screws 24, threadedly engaging suitable apertures 16. The cam sector 52 has been provided with a tongue or extension 56, seated in a suitable notch 58 in one corner of the cam sector 50. The cam sectors 50 and 52 are seated upon the flange 14 and may be adjusted by loosening the screws and adjusting into proper position, where they may be secured in position by tightening the screws. The cam sectors 50 and 52 have been provided with bevelled edges 60, over which a laterally movable cam follower 62, mounted opposite the cam follower 32, travels. The cam followers 32 and 62 need not necessarily be placed opposite each other as shown in Figure 2. They may be placed in any suitable position.

The size of the cam sectors has been shown merely for the purpose of illustration.

The extensions 36 and 56 underlie a portion of the path swept out by the cam followers. By this arrangement, the extensions provide a support for the cam followers while passing from one cam sector to the complementary cam sector.

This double cam, having a cam surface on each side, may be used in actuating cam followers that may control switches, timers, or for any other purpose where a cam may be used for actuating one or more cam followers. The center disc 10 and the cam sectors may be made from suitable material, either metallic or non-metallic material. Material may be selected that will function as an electrical conductor or dielectric material may be selected, depending entirely upon the purpose for which the cam and cam followers are to be used.

Although the preferred embodiment of the device has been described, it will be understood that within the purview of this invention various changes may be made in the form, details, proportion and arrangement of parts, the combination thereof and the mode of operation, which generally stated consist in a device capable of carrying out the objects set forth, as disclosed and defined in the appended claims.

Having thus described our invention, we claim:

1. A cam assembly including a rotatably mounted member presenting a surface normal to the axis of rotation, said rotatable member having apertures in said surface, a pair of cam sectors adjustably mounted on said surface, each of the cam sectors having an elongated opening registering with an aperture in said surface, screws for clamping the cam sectors against said surface, one of said cam sectors being provided with a notch, the other cam sector being provided with an extension projecting into the notch, a laterally movable cam follower, said notch and said extension underlying a portion of the width of the path of the cam follower so that the cam follower spans the gap between the cam sectors by resting upon the extension.

2. A cam assembly including a disc-like member, a pair of flanged collar portions fixedly attached to the disc-like member and forming a hub therefor, the flanges of said collar portions being juxtaposed upon opposite sides of the disc-like member, a pair of cam sectors adjustably mounted on one side of the disc-like member, said cam sectors cooperating to form an adjustable cam surface, and a laterally movable cam follower mounted for contact with said cam sectors and the side of the disc-like member as the case may be, said cam sectors being adjustable toward and from each other to adjust the area covered by said cam sectors, one of said cam sectors being provided with a notch underlying a portion of the width of the path of the cam follower, the other cam sector having an extension projecting into the notch so that the cam follower rests upon the extension when passing over the space between the cam sectors.

3. A cam assembly for use with a pair of laterally movable cam followers, there being one cam follower on each side of the cam assembly, said cam assembly including a disc-like member, a pair of flanged collar portions fixedly attached to the disc-like member and forming a hub therefor, the flanges of said collar portions being juxtaposed upon opposite sides of the disc-like member, a pair of cam sectors adjustably mounted on one side of the disc-like member, said cam sectors cooperating to form an adjustable cam surface, said cam sectors being adjustable toward and from each other to adjust the area covered by said cam sectors, one of said cam sectors being provided with a notch underlying a portion of the width of the path of the cam follower, the other cam sector having an extension projecting into the notch so that the cam follower rests upon the extension when passing over the space between the cam sectors, and a similar pair of cam sectors adjustably mounted upon the other side of the disc-like member.

PAUL B. BURRUS.
MERTON C. LEINBERGER.

REFERENCES CITED

The following references are of record in the file of this patent:

UNITED STATES PATENTS

| Number | Name | Date |
|---|---|---|
| 346,592 | Landfear | Aug. 3, 1886 |
| 1,464,589 | Talbot | Aug. 14, 1923 |
| 1,465,719 | Peters | Aug. 21, 1923 |
| 1,524,461 | Speer | Jan. 27, 1925 |
| 2,207,629 | Mitchell | July 9, 1940 |
| 2,307,214 | Gollmer | Jan. 5, 1943 |
| 2,308,963 | Davis et al. | Jan. 19, 1943 |
| 2,387,149 | Hicks | Oct. 16, 1945 |
| 2,404,210 | Bechler | July 16, 1946 |

FOREIGN PATENTS

| Number | Country | Date |
|---|---|---|
| 555,648 | Great Britain | Sept. 1, 1945 |